(12) United States Patent
Oinuma et al.

(10) Patent No.: US 9,914,655 B2
(45) Date of Patent: Mar. 13, 2018

(54) WATER TREATMENT APPARATUS AND WATER TREATMENT METHOD

(71) Applicant: MITSUBISHI ELECTRIC CORPORATION, Chiyoda-ku (JP)

(72) Inventors: Gaku Oinuma, Chiyoda-ku (JP); Yasutaka Inanaga, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/541,494

(22) PCT Filed: Jan. 21, 2015

(86) PCT No.: PCT/JP2015/051504
§ 371 (c)(1),
(2) Date: Jul. 5, 2017

(87) PCT Pub. No.: WO2016/117048
PCT Pub. Date: Jul. 28, 2016

(65) Prior Publication Data
US 2018/0022624 A1 Jan. 25, 2018

(51) Int. Cl.
*C02F 1/78* (2006.01)
*C02F 1/46* (2006.01)
*C02F 101/34* (2006.01)

(52) U.S. Cl.
CPC ............. *C02F 1/78* (2013.01); *C02F 1/4608* (2013.01); *C02F 2101/34* (2013.01); *C02F 2305/023* (2013.01)

(58) Field of Classification Search
None
See application file for complete search history.

(56) References Cited

U.S. PATENT DOCUMENTS

| 3,232,860 A * | 2/1966 | Waterman | B01D 17/06 |
| | | | 204/662 |
| 2008/0292497 A1 | 11/2008 | Vangeneugden et al. | |
| 2012/0153168 A1* | 6/2012 | Langeveld | G01T 3/008 |
| | | | 250/366 |

FOREIGN PATENT DOCUMENTS

| EP | 1441578 A2 * | 7/2004 | ............... H05H 1/44 |
| EP | 1 782 841 A1 | 5/2007 | |

(Continued)

OTHER PUBLICATIONS

International Search Report dated Mar. 31, 2015 in PCT/JP2015/051504 filed Jan. 21, 2015.

(Continued)

*Primary Examiner* — Walter D. Griffin
*Assistant Examiner* — Cameron J Allen
(74) *Attorney, Agent, or Firm* — Oblon, McClelland, Maier & Neustadt, L.L.P.

(57) ABSTRACT

A water treatment apparatus including a central electrode, and an outer periphery electrode, water to be treated being treated by applying a high voltage between the central electrode and the outer periphery electrode to thereby form a discharge in a discharge space between the central electrode and the outer periphery electrode and supplying the water to be treated as water droplets or a water film into the discharge space from above the discharge space, the water treatment apparatus further including a water droplet reformation unit connected to the outer periphery electrode, wherein the water droplet reformation unit captures, as trapped water, a portion of the water to be treated falling in the discharge space, performs water droplet reformation by causing the captured trapped water and gas containing (Continued)

oxygen supplied via a gas pipe to be mixed, and jets out water droplets formed by water droplet reformation into the discharge space.

10 Claims, 6 Drawing Sheets

(56) References Cited

FOREIGN PATENT DOCUMENTS

| | | |
|---|---|---|
| JP | 1-150942 U | 10/1989 |
| JP | 2000-279977 A | 10/2000 |
| JP | 2003-320373 A | 11/2003 |
| JP | 2003-340454 A | 12/2003 |
| JP | 2011-161362 A | 8/2011 |
| JP | 2011-161412 A | 8/2011 |
| WO | 2010/055729 A1 | 5/2010 |

OTHER PUBLICATIONS

Taichi Sugai et.al., "Increased Efficiency for Setting Insulation Grids for Water Treatment by Pulsed Power Discharge in Air Spraying Water Droplets", IEEE Transactions on Dielectrics and Electrical Insulations, Dec. 2012, vol. 19, No. 6, pp. 2176-2183.
V. M. Bystritskii et al., "Short-Pulsed-Electric Degradation of Aqueous Organics", 11th International Conference on High-Power Particle Beams, 1996, pp. 886-889.

* cited by examiner

WATER TREATMENT APPARATUS AND WATER TREATMENT METHOD

TECHNICAL FIELD

The present invention relates to a water treatment apparatus and a water treatment method in which water to be treated is treated using ozone, radicals, and the like generated by a discharge.

BACKGROUND ART

Until now, ozone and chlorine have been widely used in water and sewage treatment. However, persistent substances that are not decomposed by ozone or chlorine may be contained in, for example, industrial wastewater, recycled water, and the like. In particular, removal of dioxins, dioxane, and the like is a major problem.

In some areas, a method of removing persistent substances by combining ozone ($O_3$) with hydrogen peroxide ($H_2O_2$) or ultraviolet light, thereby causing hydroxyl radicals (OH radicals), which are higher in activity than ozone or chlorine, to be generated in water to be treated, is in practical use. However as equipment and operation costs are very high, this method is not very prevalent.

In view of this, a method has been proposed in which persistent substances are removed with high efficiency by causing OH radicals generated by a discharge to act directly on water to be treated. More specifically, a water treatment apparatus has been proposed in which a streamer discharge is formed by applying a pulse voltage between a linear high-voltage electrode and a cylindrical ground electrode that surrounds the high-voltage electrode, and water to be treated is treated by supplying the water to be treated in a water droplet state to a streamer discharge space from thereabove (see PTL 1, for example).

The water treatment apparatus in PTL 1 is provided with a gas suction supply means for sucking out gas from inside a treatment chamber and, during a preliminary process in which the water to be treated is formed into water droplets, supplying the sucked out gas into the water to be treated in the form of gas bubbles.

Therefore, with the water treatment apparatus in PTL 1, short-lived OH radicals generated in the streamer discharge space can be caused to act on the water to be treated efficiently. Further, ozone generated in the streamer discharge space can be used, without waste, for decomposition of a substance to be treated. As a result, decomposition treatment of the substance to be treated can be performed more efficiently.

In addition, a water treatment apparatus has been proposed in which a streamer discharge is formed by applying a pulse voltage between a linear high-voltage electrode and a cylindrical ground electrode surrounding the high-voltage electrode, and water to be treated is treated by supplying the water to be treated in a water droplet state into a streamer discharge space from thereabove, wherein grids constituted by an insulating material are formed in a plurality of stages in a region where the water droplets fall (see NPL 1, for example).

With the water treatment apparatus in NPL 1, short-lived OH radicals generated in the streamer discharge space can be caused to act on the water to be treated efficiently. Further, as the falling water droplets collide with the grids, falling speed thereof is lost, such that a residence time of the water droplets in the streamer discharge space can be prolonged. For this reason, a water treatment apparatus that realizes a higher decomposition efficiency and a higher decomposition speed can be obtained.

CITATION LIST

Patent Literature

[PTL 1] WO 2010/055729

Non Patent Literature

[NPL 1] T. Sugai et. al., "Increased Efficiency for Setting Insulation Grids for Water Treatment by Pulsed Power Discharge in Air Spraying Water Droplets", IEEE Trans. Dielectr. Electr. Insul., Vol. 19, pp. 2176-83, 2012.

SUMMARY OF INVENTION

Technical Problem

However, the following problems exist in the abovementioned prior art. That is, the conventional water treatment apparatus indicated in PTL 1 has a problem in that, if a reactor height is increased in order to increase an amount of water treated per reactor, organic matter decomposition efficiency reduces as water droplets advance toward a lower part of the reactor. Therefore, a problem exists in that high-speed water treatment and high-efficiency water treatment cannot be realized at the same time.

Further, in the conventional water treatment apparatus indicated in NPL 1, it is necessary to make spacing of the grids wide so that water droplets can fall. For this reason, particle diameters of the water droplets that fall from the grids increase, and a surface area thereof with which OH radicals and the like react is reduced. For this reason, a problem exists in that efficient treatment cannot be performed.

The present invention has been made to solve the abovementioned problems, and an object thereof is to obtain a water treatment apparatus and a water treatment method capable of performing highly efficient and high-speed decomposition of persistent substances or removal of highly concentrated organic contamination.

Solution to Problem

A water treatment apparatus according to the present invention includes a central electrode provided such that a longitudinal direction thereof is set to be vertical, and an outer periphery electrode provided coaxially with the central electrode so as to surround the central electrode, water to be treated being treated by applying a high voltage between the central electrode and the outer periphery electrode to thereby form a discharge in a discharge space between the central electrode and the outer periphery electrode and supplying the water to be treated as water droplets or a water film into the discharge space from above the discharge space, the water treatment apparatus further including a water droplet reformation unit connected to the outer periphery electrode, wherein the water droplet reformation unit captures, as trapped water, a portion of the water to be treated falling in the discharge space, performs water droplet reformation by causing the captured trapped water and gas containing oxygen supplied via a gas pipe to be mixed, and jets out water droplets formed by water droplet reformation into the discharge space.

A water treatment method according to the present invention is a water treatment method to be applied in a water treatment apparatus including a central electrode provided such that a longitudinal direction thereof is set to be vertical, and an outer periphery electrode provided coaxially with the central electrode so as to surround the central electrode, water to be treated being treated by applying a high voltage between the central electrode and the outer periphery electrode to thereby form a discharge in a discharge space between the central electrode and the outer periphery electrode and supplying the water to be treated as water droplets or a water film into the discharge space from above the discharge space, the water treatment method including, in the water droplet reformation unit connected to the outer periphery electrode, a step in which a portion of the water to be treated falling in the discharge space is captured as trapped water, a step in which water droplet reformation is performed by causing the captured trapped water and gas containing oxygen supplied via a gas pipe to be mixed, and a step in which water droplets formed by the water droplet reformation are jetted out into the discharge space.

Advantageous Effects of Invention

With the present invention, when water to be treated passes through a discharge space, a concentration of organic matter and a concentration of oxidizing substances such as ozone in the water to be treated are homogenized through repeated formation into water droplets and coalescence. As a result, speed and efficiency of organic matter decomposition does not decline even as the water to be treated proceeds to a lower part of the discharge space. Further, as gas is used to form the water droplets, water droplets having a smaller diameter are formed, such that a reactivity area between the water to be treated and oxidizing substances such as ozone is larger. As a result, a water treatment apparatus and a water treatment method capable of performing highly efficient and high-speed decomposition of persistent substances or removal of highly concentrated organic contamination can be obtained.

DESCRIPTION OF EMBODIMENTS

First Embodiment

Figure 1:
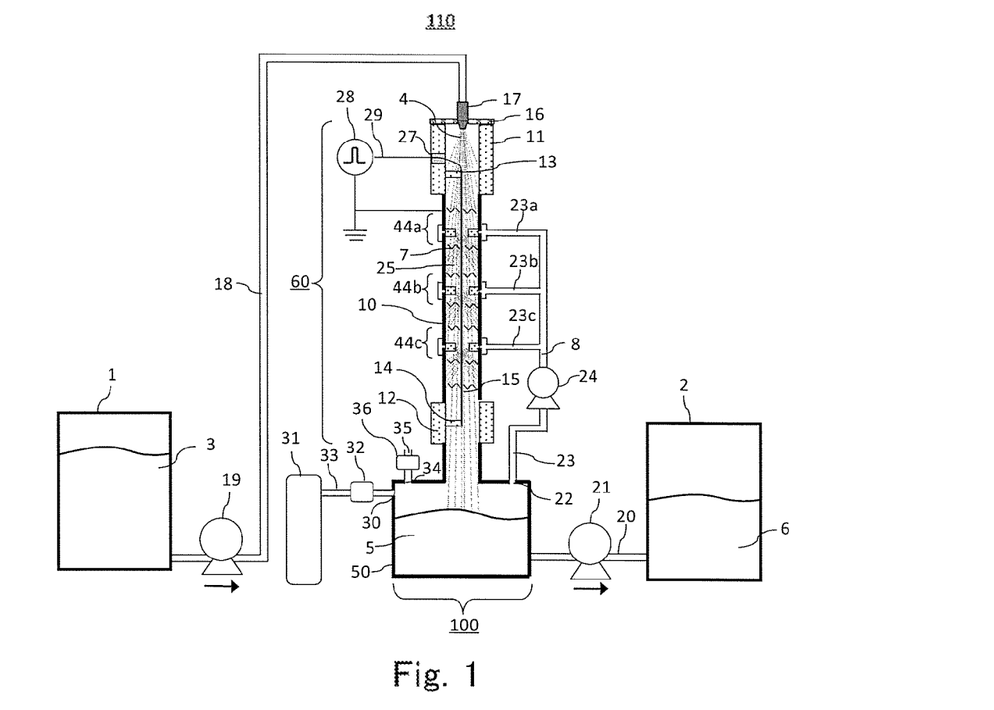
FIG. 1 is a cross-sectional view showing a water treatment apparatus according to a first embodiment of the present invention.

FIG. 1 is a cross-sectional view showing a water treatment apparatus according to a first embodiment of the present invention. A water treatment apparatus 110 is provided with a water treatment reactor 100, a water to be treated tank 1, and a treated water tank 2. The water treatment reactor 100 is provided with a water receiver 50, which is a bottom portion thereof and, thereabove, a discharge tube 60, which is hermetically connected to the water receiver 50.

The discharge tube 60 is provided with a cylindrical electrode 10, that is, an outer periphery electrode, a longitudinal direction of which is set to be vertical, a ring-shaped upper insulator 11 and a ring-shaped lower insulator 12, which are provided respectively on an upper portion and a lower portion of the cylindrical electrode 10, a rod-shaped upper holder 13 and a rod-shaped lower holder 14, which are provided respectively in the upper insulator 11 and the lower insulator 12 and extend from an outer periphery of the cylindrical electrode 10 toward a center thereof, and a wire electrode 15, that is, a central electrode, attached between the upper holder 13 and the lower holder 14 so as to be coaxial with the cylindrical electrode 10.

A gap exists between the cylindrical electrode 10 and the wire electrode 15, and the gap constitutes a discharge space 25. Space inside the upper insulator 11, the cylindrical electrode 10, and the lower insulator 12 is hermetically connected so as to be continuous in a vertical direction. A top plate 16 covering the discharge tube 60 is hermetically connected to an uppermost part of the upper insulator 11. Further, a nozzle 17 is attached, so as to face downward in a vertical direction, at a central vicinity of the top plate 16 in a position at which the axis thereof is coincident with that of the wire electrode 15.

In addition, the discharge tube 60 is provided with three water droplet reformation units 44a, 44b, and 44c, arranged sequentially in a longitudinal direction. A suction port 22 is provided in an upper part of the water receiver 50. In addition, a circulation pipe 23 is attached to the suction port 22. Further, the circulation pipe 23 is provided with a compressor 24, that is, a gas suction unit.

The circulation pipe 23 is branched into three lines, namely 23a, 23b, and 23c, at a subsequent stage to the compressor 24. The branched circulation pipes 23a, 23b, and 23c are respectively connected to the water droplet reformation units 44a, 44b, and 44c.

The water to be treated tank 1 and the nozzle 17 are connected to each other by a water supply pipe 18, and the water supply pipe 18 is provided with a water supply pump 19.

In addition, a bottom vicinity of the water receiver 50 and the treated water tank 2 are connected to each other by a drainpipe 20. Further, the drainpipe 20 is provided with a drainage pump 21.

The upper insulator 11 is provided with an introduction terminal 27, and a high voltage power supply 28 and the wire electrode 15 are connected to each other by an electric wire 29 via the introduction terminal 27. Further, the cylindrical electrode 10 is electrically grounded.

A gas supply port 30 is formed in the water receiver 50. The gas supply port 30 and an oxygen gas supply source 31 are connected to each other by a gas pipe 33 via a flow rate regulator 32. Further, an exhaust port 34 is formed at an upper part of the water receiver 50. A check valve 36 is attached to an exhaust pipe 35, which is connected to the exhaust port 34.

Figure 2:
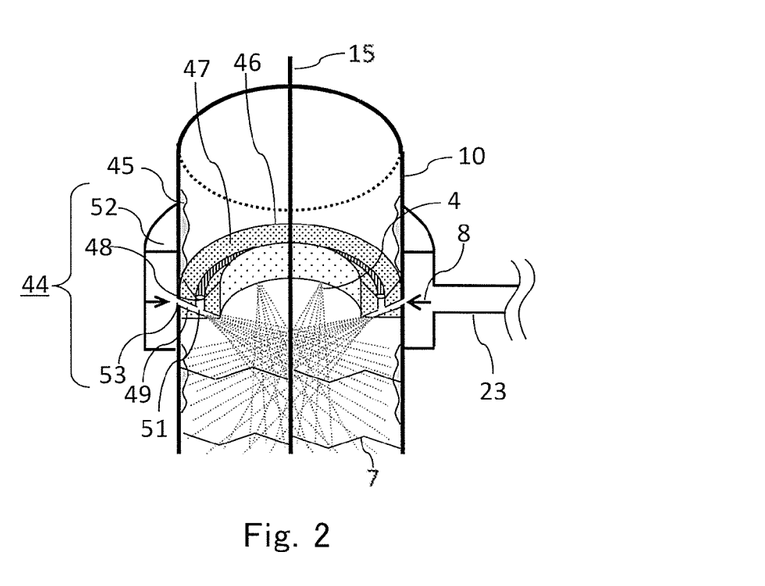
FIG. 2 is a cross-sectional perspective view of a discharge tube according to the first embodiment of the present invention.
Figure 3:
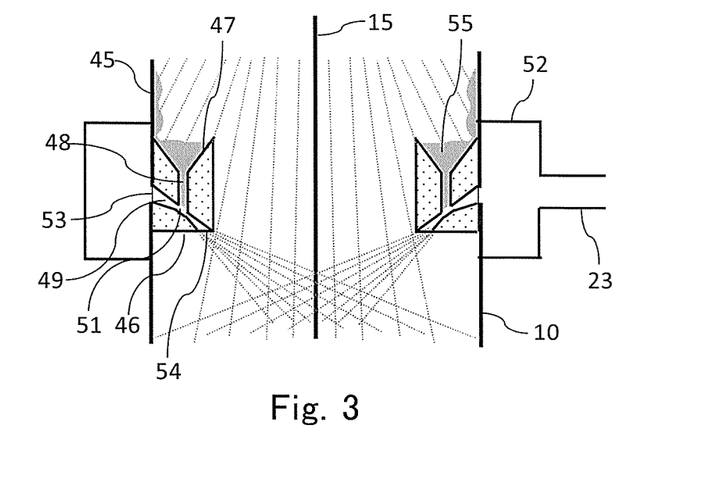
FIG. 3 is a transverse sectional view of a water droplet reformation unit according to the first embodiment of the present invention.
Figure 4:
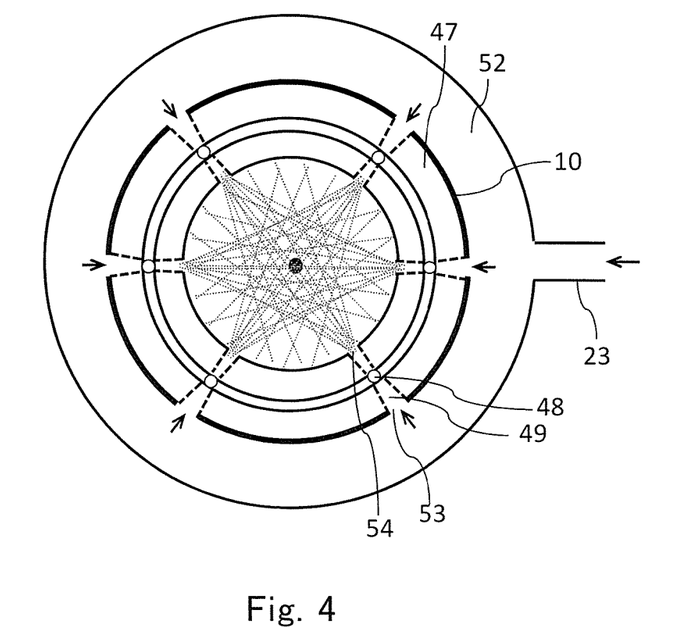
FIG. 4 is a longitudinal sectional view of the water droplet reformation unit according to the first embodiment of the present invention.

FIG. 2 is a cross-sectional perspective view of the discharge tube 60 according to the first embodiment of the present invention. FIG. 3 is a transverse cross-sectional view of a water droplet reformation unit 44 according to the first embodiment of the present invention. Further, FIG. 4 is a longitudinal sectional view of the water droplet reformation unit 44 according to the first embodiment of the present invention. A specific water treatment in the first embodiment will be described hereinafter using FIG. 2, FIG. 3, and FIG. 4.

The cylindrical electrode 10 is provided with the water droplet reformation unit 44. The water droplet reformation unit 44 in the first embodiment is provided with a ring-shaped circulated gas flow path 52, which covers an outer surface of the cylindrical electrode 10, and a water-droplet-forming member 46 (a capturing member) constituted by a ring-shaped insulator and attached so as to run along an inner surface of the cylindrical electrode 10.

The water-droplet-forming member 46 is attached to the cylindrical electrode 10 in such a way that a predetermined gap is formed between the water-droplet-forming member 46 and the wire electrode 15 and contact does not occur therebetween. An upper surface side of the water-droplet-forming member 46 has an inclined surface 47 (a collecting portion) formed so that a central vicinity thereof is lowest. A plurality of water flow paths 48 are formed in the longitudinal direction so as to extend from a lowest part of the inclined surface 47. Note that the water flow paths 48 are formed so as not to penetrate a bottom of the water-droplet-forming member 46.

The water-droplet-forming member 46 includes gas flow paths 49. The gas flow paths 49 are formed so as to penetrate obliquely downward from an outer periphery of the water-droplet-forming member 46 toward an inner periphery thereof. Further, the gas flow path 49 communicates with a jet port 54 formed on the inner periphery of the water-droplet-forming member 46. The gas flow path 49 and the water flow path 48 intersect each other at an intersection 51.

The cylindrical electrode 10 is provided with a plurality of through holes 53 that penetrate a tube wall. The through holes 53 are formed at a position continuous to the gas flow paths 49, and gas flowing through the circulated gas flow path passes through the gas flow paths 49 from the through holes 53 to the discharge space 25. Further, a cross-sectional area of the gas flow paths 49 is smallest at the intersection 51.

Next, water treatment operations in the first embodiment will be described using FIG. 1 to FIG. 4. Oxygen gas supplied from the oxygen gas supply source 31 passes through the gas pipe 33 and, following adjustment to a predetermined flow rate by the flow rate regulator 32, is supplied into the water receiver 50 from the gas supply port 30.

Gas is exhausted from the exhaust pipe 35 to an exterior at the same flow rate as the flow rate of the supplied oxygen gas. Here, the flow of gas in the exhaust pipe 35 is restricted to one direction, that is, from the water receiver 50 to the exterior, by the check valve 36.

By driving the compressor 24, gas in the water treatment reactor 100 is sucked out from the suction port 22, passes through the circulation pipe 23, and is supplied to the water droplet reformation units 44a, 44b, and 44c.

Meanwhile, by driving the water supply pump 19, water to be treated 3 in the water to be treated tank 1 is sucked out therefrom, passes through the water supply pipe 18 and is supplied to the nozzle 17. The water to be treated 3 is formed into water droplets by the nozzle 17, falls inside the upper insulator 11, the cylindrical electrode 10, and the lower insulator 12, and is accumulated in the water receiver 50 as accumulated water 5.

At this time, a portion of water droplets 4 falling from the nozzle 17 adhere to an inner wall of the cylindrical electrode 10 and flow downward while forming a water film 45, run down the inclined surface 47 of the water-droplet-forming member 46 in the water droplet reformation unit 44a and become trapped water 55.

In addition, a portion of the water droplets 4 formed by the nozzle 17, in the process of falling inside the cylindrical electrode 10, collide with the upper surface of the water-droplet-forming member 46, flow downward along the inclined surface 47, and become trapped water 55.

Then, the trapped water 55 runs down through the water flow path 48 and is jetted out in the form of water droplets from the jet port 54 via the intersection 51 by the circulated gas 8 flowing through the gas flow path 49.

At this time, the cross-sectional area of the gas flow path 49 is smallest at the intersection 51. For this reason, negative pressure is generated in the water flow path 48 by the Venturi effect, which sucks in the trapped water 55. As a result, the trapped water 55 and the circulated gas 8 are mixed to form water droplets.

In the same way as in the water droplet reformation unit 44a, portions of the water to be treated 3 falling in the discharge tube 60 are, likewise, repeatedly captured and reformed as water droplets in the water droplet reformation units 44b and 44c therebelow. The water to be treated 3 subsequently reaches the water receiver 50, is accumulated therein as accumulated water 5, passes through the drainpipe 20 due to the drainage pump 21, and is transported to the treated water tank 2 to become treated water 6.

Here, in the process of the water to be treated 3 falling in the discharge tube 60, the high voltage power supply 28 is operated and a pulsed high voltage is applied to the wire electrode 15, thereby forming discharges 7 in the discharge space 25 between the wire electrode 15 and the cylindrical electrode 10, with the result that oxidizing particles such as OH radicals and $O_3$ are generated. As a result, organic matter in the water to be treated 3 falling in the discharge tube 60 reacts with the oxidizing particles such as OH radicals and $O_3$ and decomposes, whereby water treatment is performed.

Next, principles by which water treatment of the water to be treated 3 is performed by the water treatment apparatus indicated in the first embodiment will be described. Here, description is given using decomposition of organic matter as an example, however, it is a well-known fact that $O_3$ and OH radicals generated by a discharge are also effective for removal of bacteria, decoloration, and deodorization.

The discharges 7 are formed in the discharge space 25 by applying a pulse voltage to the wire electrode 15. At this time, oxygen molecules ($O_2$) and water molecules ($H_2O$) collide with high-energy electrons, and dissociation reactions indicated by the following formulas (1) and (2) occur. Here, e is an electron, O is atomic oxygen, H is atomic hydrogen, and OH is an OH radical.

$$e + O_2 \rightarrow 2O \qquad (1)$$

$$e + H_2O \rightarrow H + OH \qquad (2)$$

Much of the atomic oxygen generated in the above formula (1) becomes ozone ($O_3$) due to the reaction of the following formula (3). Here, M is a third body of the reaction and represents any molecule or atom present in air.

$$O+O_2+M \rightarrow O_3 \quad (3)$$

Further, a portion of the OH radicals generated by the above formula (2) become hydrogen peroxide ($H_2O_2$) due to the reaction of the following formula (4).

$$OH+OH \rightarrow H_2O_2 \quad (4)$$

Oxidizing particles (O, OH, $O_3$, and $H_2O_2$) generated by the reactions of the above formulas (1) to (4) react, by the following formula (5), with organic matter on water surfaces of the water droplets 4 and the water film 45 and oxidatively decompose the organic matter into carbon dioxide ($CO_2$) and water. Here, R is organic matter to be treated.

$$R+(O,OH,O_3,H_2O_2) \rightarrow CO_2+H_2O \quad (5)$$

Meanwhile, a portion of the $O_3$ and $H_2O_2$ generated by the above formulas (3) and (4) is dissolved into the water to be treated 3 from the water surfaces of the water droplets 4 and the water film 45 by the following formulas (6) and (7). Here, (l) indicates a liquid phase.

$$O_3 \rightarrow O_3(l) \quad (6)$$

$$H_2O_2 \rightarrow H_2O_2(l) \quad (7)$$

Further, OH radicals are generated in water by a reaction between $O_3$ (l) and $H_2O_2$ (l) as indicated by the following formula (8).

$$O_3(l)+H_2O_2(l) \rightarrow OH(l) \quad (8)$$

$O_3$ (l), $H_2O_2$ (l), and OH (l) generated by the above formulas (6) to (8) decompose organic matter through a reaction in water as indicated by the following formula (9).

$$R+(O_3(l),H_2O_2(l),OH(l)) \rightarrow CO_2+H_2O \quad (9)$$

As described above, decomposition of organic matter the in water to be treated 3 by the first embodiment can be thought of as proceeding through both decomposition of organic matter on surface layers of the water droplets 4 and the water film 45 by the reaction indicated by the above formula (5) and decomposition of organic matter in water by the reaction shown in the above formula (9).

Next, reasons for which decomposition of persistent substances and removal of highly concentrated organic contamination can be performed with high efficiency and high speed by the water treatment apparatus according to the first embodiment will be described.

When the water droplets 4 fall in the discharge space 25 or when the water film 45 flows down the inner wall of the cylindrical electrode 10, organic matter on the surface layers of the water droplets 4 and the water film 45 is decomposed by the reaction of the above formula (5). As a result, the amount of organic matter on the surface layers of the water droplets 4 and the water film 45 is reduced, the reaction frequency between oxidizing substances such as OH radicals and organic matter decreases, and a proportion of oxidizing substances such as OH that is ineffectively consumed increases.

Organic matter in the water droplets 4 and the water film 45 is also decomposed by the reaction of the above formula (9). However, as diffusion of $O_3$ (l) and $H_2O_2$ (l) in water is slow, $O_3$ (l), $H_2O_2$ (l), and OH (l) concentrate near the surface layers of the water droplets 4 and the water film 45, and do not diffuse into an interior of the water droplets 4 or into a deeper part of the water film 45.

For this reason, as organic matter near the surface is decomposed immediately after the water droplets 4 start to fall down in the discharge space 25 or immediately after the water film 45 starts flowing down the inner wall of the cylindrical electrode 10, concentrations of $O_3$ (l), $H_2O_2$ (l), and OH (l) on the surface layers of the water droplets 4 and the water film 45 increase while a concentration of organic matter decreases and, conversely, concentrations of $O_3$ (l), $H_2O_2$ (l), and OH (l) in the interior of the water droplets 4 and in the deeper part of the water film 45 decrease while a concentration of organic matter increases. For this reason, reaction frequency of the above formulas (5) and (9) decreases in both regions and efficiency of water treatment is reduced.

However, in the first embodiment, the water droplets 4 and the water film 45 formed by the nozzle 17 are subjected, until the water droplet reformation unit 44a has been reached, to the reactions of the above formulas (5) and (9), such that organic matter near the surfaces thereof is decomposed. Next, a portion of the water droplets 4 and the water film 45 collide with the inclined surface 47 of the water droplet reformation unit 44a, thereby coalescing with other water droplets as the trapped water 55. In this process, organic matter, $O_3$ (l), and $H_2O_2$ (l) are agitated and concentrations thereof homogenized such that the reaction of the above formula (9) occurs throughout all of the trapped water 55.

Further, new water droplets 4 formed by the water droplet reformation unit 44a, an organic matter concentration thereof having been homogenized, are re-supplied into the discharge space 25. Therefore, new organic matter appears on the surfaces of the water droplets, the reaction of the above formula (5) occurs actively again, and decomposition of the organic matter proceeds. The same process is repeated thereafter as portions of the water droplets 4 and the water film 45 pass through the water droplet reformation units 44b and 44c.

In other words, in the first embodiment, water droplet formation and coalescence is repeated as the water to be treated 3 falls in the discharge space 25. Each time, $O_3$ (l) and $H_2O_2$ (l) are agitated and homogenized, and new organic matter appears on the surfaces of the water droplets 4. As a result, ineffective consumption of oxidizing substances such as OH radicals is suppressed and decomposition of organic matter by the above formulas (5) and (9) takes place efficiently.

Here, decomposition of organic matter in water to be treated flowing downward as a water film is less effective than decomposition of organic matter in water to be treated falling as water droplets. This is because, when compared using the same volume of water, a surface area of the water film 45 is smaller than that of the water droplets 4 and, accordingly, the frequency at which the reactions of the above formulas (5) to (7) take place is lower.

However, as shown in FIG. 3, in the first embodiment, all of the water film 45 flowing down the inner wall of the cylindrical electrode 10 is captured in the water droplet reformation units 44a, 44b, and 44c, and then jetted into the discharge space 25 as water droplets. Therefore, the water film 45, in which organic matter decomposition efficiency is low, is converted into the water droplets 4, in which organic matter decomposition efficiency is high, such that water treatment efficiency increases as a whole.

Moreover, when compared using the same volume of water, a surface area of the water droplets 4 is larger when a size thereof (a water droplet diameter) is smaller, such that organic matter is decomposed more efficiently. In other words, a large number of water droplets 4 having a small diameter allows water treatment to occur more efficiently than with a small number of water droplets 4 having a large diameter.

With the first embodiment, the trapped water 55 is formed into water droplets in the water droplet reformation units 44a, 44b, and 44c by the circulated gas 8. For this reason, the water droplets 4 can be formed so as to have a smaller diameter such that water treatment efficiency improves in comparison to when, as in NPL 1 for example, the water to be treated 3 having been captured by a grid falls due to gravity.

Further, as shown in FIG. 1, in the first embodiment, the water droplets are jetted obliquely downward by the water droplet reformation units 44a, 44b, and 44c. For this reason, in contrast to when the water droplets fall perpendicularly downward, travel also occurs in the lateral direction. As a result, a distance traveled in the discharge space 25 is longer in comparison to when the water droplets fall perpendicularly downward, and contact between the water droplets and oxidizing substances such as OH radicals occurs more, such that decomposition of organic matter proceeds quickly.

Also, as the water droplets 4 are jetted obliquely downward, a portion thereof collides with and adheres to the wire electrode 15. For this reason, an effect is obtained in which the wire electrode 15, a temperature thereof having risen due to discharges, is cooled by the adhesion of the water droplets 4 thereto. As a result, breakage of the wire electrode 15 can be prevented even when a high discharge power is applied, and the apparatus can be stably operated for a long time.

Moreover, in the first embodiment, water droplets 4 are formed by supplying the circulated gas 8 to the water droplet reformation units 44a, 44b, and 44c. It is therefore unnecessary to prepare a separate gas. For this reason, an amount of oxygen gas supplied from the oxygen gas supply source 31 need only be enough to compensate for an amount thereof consumed by decomposition of organic matter and an amount consumed by dissolution thereof into the water to be treated 3, such that it is possible to perform efficient, high-speed water treatment without increasing a gas cost.

Further, in the first embodiment, a separate gas for water droplet reformation is not supplied. For this reason, the supplied oxygen gas stays in the discharge space 25 for a long period of time, and an ozone gas concentration increases. Here, the ozone dissolution reaction of the above formula (6) proceeds more readily when the ozone gas concentration is higher. As a result, a dissolved ozone concentration ($O_3$ (l)) also increases, such that decomposition of organic matter by the above formula (9) occurs efficiently and at high speed.

Further, in the first embodiment, oxidizing particles such as ozone generated by the discharges 7 are contained in the circulated gas 8. Accordingly, when water droplets are formed by the water droplet reformation units 44, the circulated gas 8 containing oxidizing particles and the water to be treated 3 contact each other, thereby facilitating dissolution of ozone into the water to be treated 3. As a result, high-speed and efficient water treatment can be performed.

Note that, in the first embodiment, the water droplets 4 are formed by the nozzle 17. However, a means for forming the water droplets 4 is not limited to the nozzle 17. For example, a showerhead can be used as a means for forming the water droplets 4, as can ultrasonic atomization or electrostatic atomization.

Further, there is no specific limit on the particle diameter of water droplets to be formed. In general, however, the area of the gas-liquid interface increases when the particle diameter is smaller, allowing water treatment to proceed efficiently and at high speed.

However, more energy is required to form water droplets that have a small particle diameter than to form water droplets that have a large particle diameter. Therefore, it is preferable to appropriately determine the particle diameter of the water droplets upon consideration of water treatment efficiency and speed.

Although the wire electrode 15 is used in the first embodiment, a material used for or a wire diameter thereof can be appropriately determined in accordance with specifications of the high voltage power supply 28, an operating ratio of the water treatment apparatus 110 and, further, a water quality of the water to be treated 3. For example, by making the wire electrode 15 thinner, the electric field is concentrated and a discharge can be formed with a lower voltage, with the result that performance required of the high voltage power supply 28 can be lowered.

However, by making the wire electrode 15 thinner, the possibility of breakage increases. As a result, it is necessary to frequently replace the wire electrode 15, which brings about an increase in maintenance costs and a decrease in the operating ratio of the apparatus.

Stainless steel or titanium, which have excellent resistance to corrosion, are desirable as the material to be used for the wire electrode 15, although appropriate selection should be made upon consideration of cost and lifespan. In addition, the central electrode is not required to have a wire shape as in the first embodiment, and a rod shape, a rod shape having projections, a screw shape, or the like, for example, may also be used.

Further, although oxygen gas is supplied into the water treatment reactor 100 in the first embodiment, the supplied gas is not limited to oxygen. As long as in a gas containing oxygen, the reactions of the above formulas (1) to (9) occur such that water treatment can be performed. A mixed gas constituted by oxygen and a rare gas such as argon, for example, can be used as the gas to be supplied into the water treatment reactor 100.

In general, when oxygen is mixed with a rare gas, the voltage necessary for forming a discharge decreases. For this reason, the voltage output from the high voltage power supply 28 can be reduced, which leads to a reduction in the cost of the apparatus. Moreover, if a mixed gas constituted by oxygen and nitrogen, or specifically, air is used, the gas supply source is no longer necessary, and water treatment can be performed under normal atmospheric conditions.

However, the speed at which ozone is generated by the discharges increases as the concentration of oxygen in the gas rises. Therefore, in general, the speed of water treatment improves when the oxygen concentration is higher. Accordingly, it is desirable to determine gas composition upon consideration of gas cost and speed of water treatment.

Further, in the first embodiment, three of the water droplet reformation units 44 are provided, however, a number water droplet reformation units 44 is not limited thereto, and the effect of the present invention can be obtained as long as one or more of the water droplet reformation units 44 are provided. In general, formation and coalescence of water droplets is repeated at a higher frequency when a larger number of the water droplet reformation units 44 are used, with the result that efficiency and speed of water treatment are improved. On the other hand, if the number of water droplet reformation units 44 is made excessive, an effect thereof tends to saturate. Accordingly, it is preferable to determine the number of water droplet reformation units 44 upon consideration of the flow rate of the water to be treated 3, the height of the discharge tube 60, the particle diameter of the water droplets 4, and the like.

Further, in the first embodiment, it is preferable to set a pressure in the water treatment reactor 100 so as to be in the vicinity of atmospheric pressure to make supply and drainage of the water to be treated 3 easier. However, the pressure in the water treatment reactor 100 can also be set to positive pressure or negative pressure as required. When pressure in the water treatment reactor 100 is set to positive pressure, contamination by air from the exterior is suppressed such that the atmosphere therein can be easily managed.

Further, when the pressure in the water treatment reactor 100 is set to negative pressure, discharges are formed at a relatively low voltage, such that it is possible to downsize and simplify the high voltage power supply 28. Moreover, as discharges are more inclined to disperse when the pressure is lower, the water to be treated 3 contacts the discharges 7 over a wider area, such that efficiency and speed of water treatment are improved.

Further, in the first embodiment, the direction at which water droplets are jetted from the water droplet reformation unit 44 does not necessarily have to be obliquely downward as shown in FIG. 2, and can be set arbitrarily. For example, if the gas flow path 49 is provided at an incline so as to be lower at the outer peripheral side of the water-droplet-forming member 46 and higher at the center side thereof, the water droplets 4 jetted from the jet port 54 will be directed obliquely upward.

In such a case, the formed water droplets having initially advanced obliquely upward then begin to fall due to gravity such that, in comparison to when jetted downward, a residence time thereof in the discharge tube 60 is extended. As a result, efficiency and speed of water treatment are improved.

Note that, in the first embodiment, a pulse voltage is output from the high voltage power supply 28 to form the discharges 7. However, as long as discharges can be stably formed, a pulse voltage is not necessarily required, and an AC voltage or a DC voltage, for example, may also be used. Further, a polarity, a peak voltage value, a repetition frequency, a pulse width, and the like of a pulse voltage can be appropriately determined in accordance with various conditions such as electrode structure and gas type.

In general, a peak voltage value of 1 kV to 50 kV is desirable. This is because a stable discharge is not formed if the voltage is less than 1 kV, and cost increases markedly if the voltage set to more than 50 kV due to enlargement of the power supply and difficulties involved in electrical insulation.

Further, it is preferable to set the repetition frequency at 10 pps (pulse-per-second) to 100 kpps. This is because if the repetition frequency is lower than 10 pps, a very high voltage is required to apply sufficient discharge power, whereas if the repetition frequency is higher than 100 kpps, the effect of water treatment is saturated and power efficiency decreases. Further, the voltage, the pulse width, and the pulse repetition frequency may be adjusted in accordance with the flow rate of the water to be treated 3 or a concentration of a substance to be treated.

Further, in the first embodiment, the trapped water 55 is formed into water droplets by supplying the circulated gas 8 to the water droplet reformation units 44. However, the gas supplied to the water droplet reformation units 44 does not necessarily have to be circulated gas. For example, the oxygen gas from the oxygen gas supply source 31 may be supplied from the water droplet reformation unit 44 instead of being supplied from the gas supply port 30. Alternatively, a gas source for supplying the water droplet reformation units 44 may be separately arranged and used.

However, the effect in which dissolution of ozone in water to be treated 3 is facilitated by contact between the circulated gas 8 containing oxidizing particles and the water to be treated 3, and the effect in which efficient, high-speed water treatment is performed at low cost by reducing an amount of gas used, are obtained by using circulated gas. Accordingly, it is more appropriate to form the water droplets 4 in the water droplet reformation units 44 using the circulated gas 8 as in the first embodiment.

Second Embodiment

Figure 5:
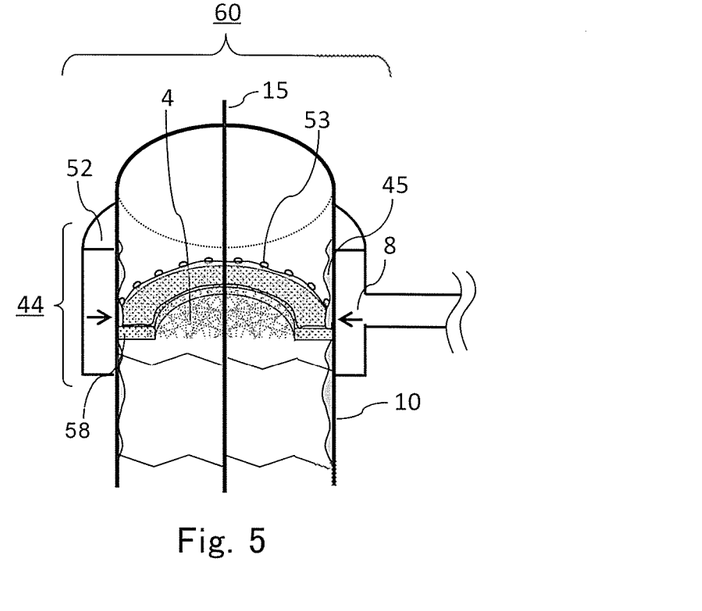
FIG. 5 is a cross-sectional perspective view of a discharge tube according to a second embodiment of the present invention.
Figure 6:
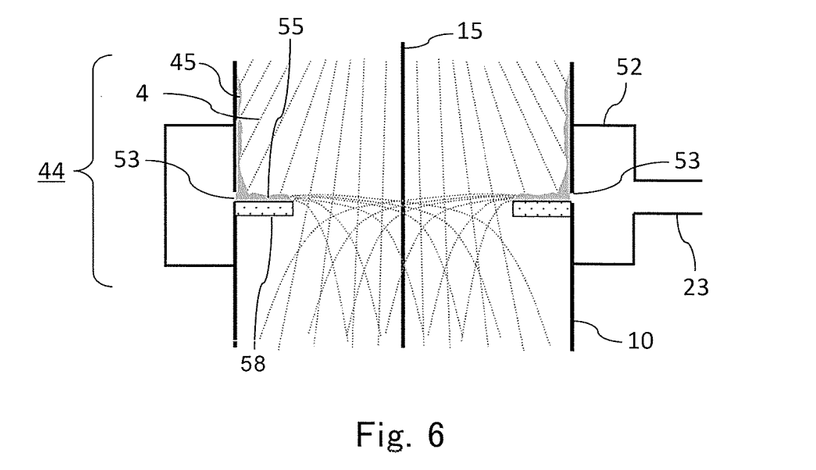
FIG. 6 is a transverse sectional view of a water droplet reformation unit according to the second embodiment of the present invention.

FIG. 5 is a cross-sectional perspective view of a discharge tube 60 according to a second embodiment of the present invention. FIG. 6 is a transverse sectional view of a water droplet reformation unit 44 according to the second embodiment of the present invention. Upon comparison, a configuration of the water droplet reformation unit 44 in the second embodiment differs from that of the first embodiment. In FIG. 5 and FIG. 6, the water droplet reformation unit 44 in the second embodiment is provided with a circulated gas flow path 52, through holes 53, and a baffle plate 58, that is, a capturing member.

A plurality of the through holes 53 are formed in a circle of uniform height around and so as to penetrate an outer periphery of a cylindrical electrode 10. A baffle plate 58 is provided immediately below the through holes 53 on an inner side the cylindrical electrode 10. Here, the baffle plate 58 is disposed via a gap so as not to contact a wire electrode 15. The circulated gas flow path 52 is provided so as to cover the through holes 53 from the outer periphery of the cylindrical electrode 10, and is hermetically connected to the cylindrical electrode 10. Other configurations are the same as those of the first embodiment.

Next, water treatment operations in the second embodiment will be described using FIG. 5 and FIG. 6. A portion of water droplets 4 and a water film 45 falling in the cylindrical electrode 10 are trapped on an upper surface of the baffle plate 58, that is, a collecting portion, and accumulated on the baffle plate 58 as trapped water 55. Here, circulated gas 8 flows from the circulated gas flow path 52 and through the through hole 53 toward the interior of the cylindrical electrode 10. As a result, the trapped water 55 mixes with the circulated gas 8, is flicked off the baffle plate 58, and falls into the cylindrical electrode 10 as water droplets. Other operations are the same as those of the first embodiment.

With the second embodiment, repetition of water droplet formation and coalescence of the water to be treated 3 can be realized using a simpler configuration than that of the first embodiment. As a result, highly efficient and high-speed water treatment can be achieved similarly to as in the first embodiment.

Note that, in the second embodiment, it is not necessarily required that the baffle plate 58 is attached horizontally as indicated in FIG. 5 and FIG. 6. For example, an upper surface of the baffle plate 58 may have an incline so as to be lower at an outer peripheral side of the cylindrical electrode 10 and higher at a center side thereof. In such a case, the water droplets formed by the water droplet reformation unit 44 are jetted obliquely upward and are thus present in the interior of the discharge tube 60 for a longer period of time. As a result, efficiency and speed of water treatment can be increased.

Third Embodiment

Figure 7:
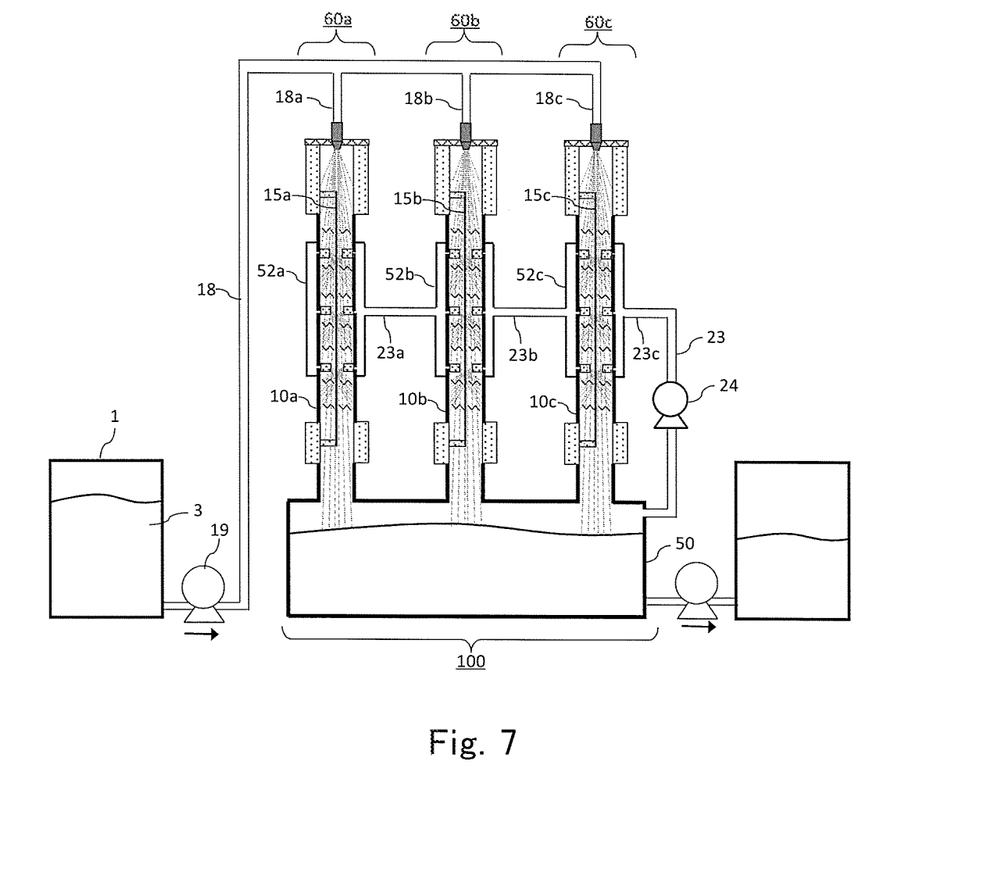
FIG. 7 is a cross-sectional view showing a water treatment apparatus according to a third embodiment of the present invention.

FIG. 7 is a cross-sectional view showing a water treatment apparatus according to a third embodiment of the present invention. The third embodiment differs from the first embodiment in that a water treatment reactor 100 is provided with three discharge tubes 60a, 60b, and 60c and one water receiver 50. In FIG. 7, a water supply pipe 18 connected from the water to be treated tank 1 is branched into three lines (18a, 18b, and 18c), which are respectively connected to the discharge tubes 60a, 60b, and 60c.

That is to say, the respective discharge tubes 60a, 60b, and 60c are connected in parallel to the water to be treated tank 1. In addition, the discharge tubes 60a, 60b, and 60c are respectively provided with circulated gas flow paths 52a, 52b, and 52c, all of which are provided so as to cover cylindrical electrodes 10a, 10b, and 10c.

Moreover, circulation pipes 23a, 23b, and 23c are respectively connected to the circulated gas flow paths 52a, 52b, and 52c, and the circulation pipes 23a, 23b, and 23c are all connected to a circulation pipe 23, which is connected to the water receiver 50.

Further, wire electrodes 15a, 15b, and 15c respectively provided in the discharge tubes 60a, 60b, and 60c are connected in parallel to a high voltage power supply 28 (not shown). In addition, the cylindrical electrodes 10a, 10b, and 10c are all electrically grounded. Other configurations are the same as those of the first embodiment.

Next, water treatment operations in the third embodiment will be described using FIG. 7. Water to be treated 3 in the water to be treated tank 1 is transported by a water supply pump 19, flows through the water supply pipes 18, 18a, 18b, and 18c, and is supplied to each of the discharge tubes 60a, 60b, and 60c, which are provided in parallel, in the form of water droplets. At this time, the high voltage power supply 28 (not shown) is driven and a high voltage pulse voltage is applied to the wire electrodes 15a, 15b, and 15c, thereby forming discharges in the discharge tubes 60a, 60b, and 60c.

Further, by operating a compressor 24 to suck out gas in the water receiver 50 and supplying the sucked out gas to the discharge tubes 60a, 60b, and 60c through the circulated gas flow paths 52a, 52b, and 52c, water to be treated 3 is formed into water droplets. Details concerning water droplet reformation units and other operations are the same as those of the first embodiment.

With the third embodiment, discharges can be formed in each of the three discharge tubes 60a, 60b, and 60c connected in parallel to the single high voltage power supply 28. As a result, water treatment speed is improved in comparison to when only one discharge tube is provided as in the first embodiment.

The three-line circulation pipes 23a, 23b, and 23c and the circulated gas flow paths 52a, 52b, and 52c are connected to the single compressor 24. Therefore, by driving the compressor 24, water droplets can be formed from the water to be treated 3 in each of the three discharge tubes 60a, 60b, and 60c. Accordingly, in comparison to a case in which three of the water treatment apparatuses as in the first embodiment are used, for example, the apparatus can be greatly simplified.

Further, with the third embodiment, the circulated gas flow paths 52a, 52b, and 52c are provided so as to cover the cylindrical electrodes 10a, 10b, and 10c, and have a double pipe configuration. For this reason, although three of the water droplet reformation units 44 are provided for each of the discharge tubes, only one circulation pipe 23 is required for each of the discharge tubes, in contrast to the first embodiment, with the result that the configuration of the apparatus is simplified.

In FIG. 7, the circulation pipes 23a, 23b, and 23c are connected in series to the compressor 24, however, the circulation pipe 23 may also be branched into three lines, which are connected to the compressor 24 in parallel. In other words, any configuration in which the circulated gas flow paths 52a, 52b, and 52c are connected by pipes to form one continuous space is sufficient.

Fourth Embodiment

Figure 8:
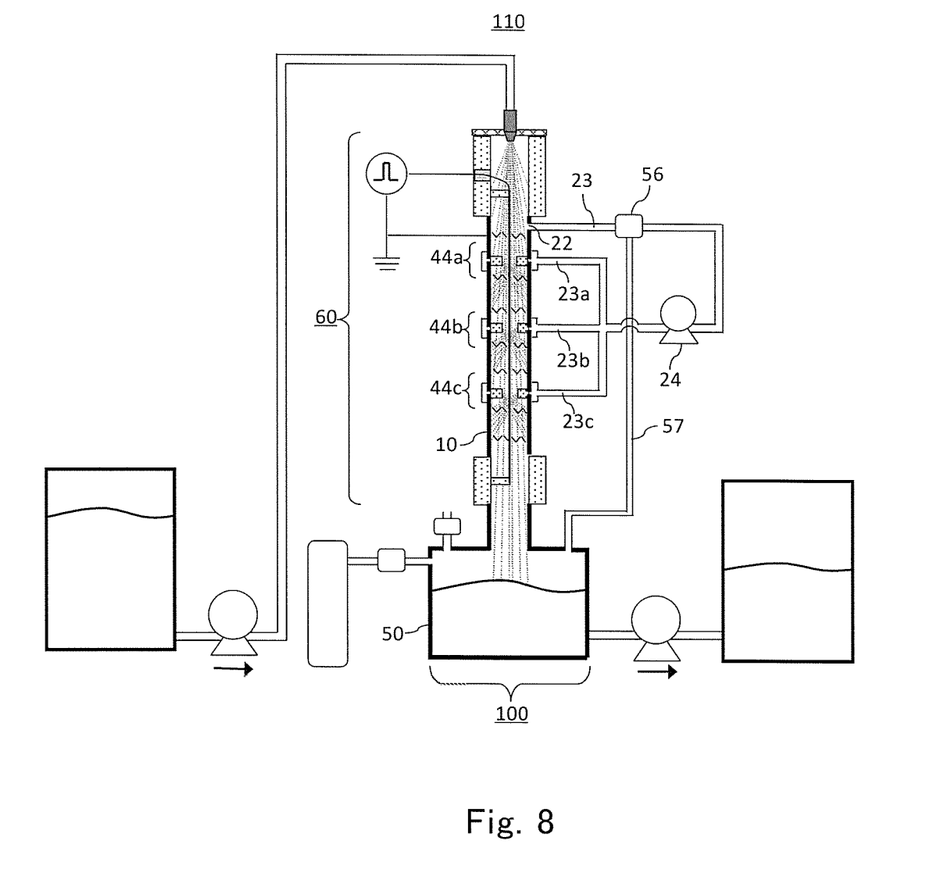
FIG. 8 is a cross-sectional view showing a water treatment apparatus according to a fourth embodiment of the present invention.

FIG. 8 is a cross-sectional view showing a water treatment apparatus according to a fourth embodiment of the present invention. In the fourth embodiment, a suction port 22 is provided in the vicinity of an uppermost part of a cylindrical electrode 10. A gas-liquid separator 56 is provided in a circulation pipe 23 between the suction port 22 and a compressor 24. A gas outlet of the gas-liquid separator 56 is connected to the compressor 24, and a liquid outlet of the gas-liquid separator 56 is connected to a drainpipe 57. Further, the drainpipe 57 is connected to a water receiver 50. Other configurations are the same as those of the first embodiment.

Next, water treatment operations in the fourth embodiment will be described. By operating the compressor 24, gas in an interior of a discharge tube 60 is sucked out therefrom. At this time, water to be treated 3 may be sucked out together with the gas from the suction port 22. However, in the fourth embodiment, the water to be treated 3 is separated from the gas by the gas-liquid separator 56 and sent to the water receiver 50 through the drainpipe 57.

Meanwhile, the gas separated from the water to be treated 3 by the gas-liquid separator 56 is sent through the compressor 24 to water droplet reformation units 44a, 44b, and 44c as circulated gas 8. Other operations are the same as those of the first embodiment.

With the fourth embodiment, the suction port 22 is formed in the vicinity of the uppermost part of the cylindrical electrode 10. Therefore, a flow of the gas in the discharge tube 60 is an upward flow directed from the water droplet reformation units 44c, 44b, and 44a toward the suction port 22. As a result, the gas flow flows counter to the falling water to be treated 3, which facilitates contact between the water to be treated 3 and ozone or the like in the discharge tube 60, such that speed and efficiency of water treatment can be improved.

Fifth Embodiment

Figure 9:
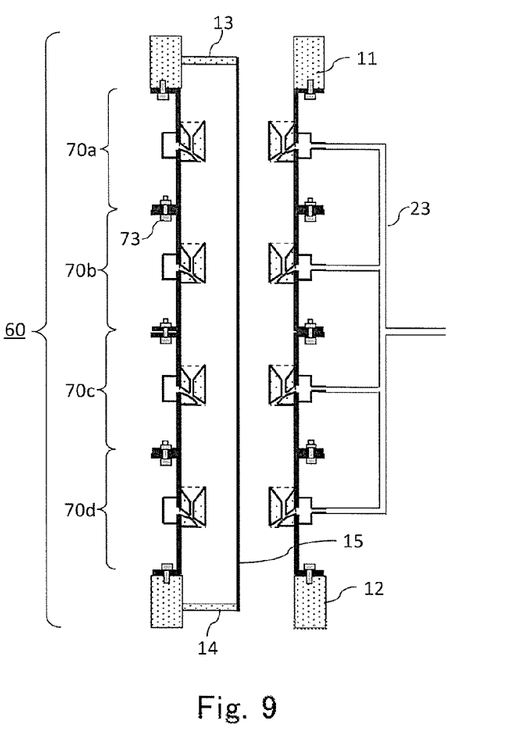
FIG. 9 is a cross-sectional view of a discharge tube according to a fifth embodiment of the present invention.
Figure 10:
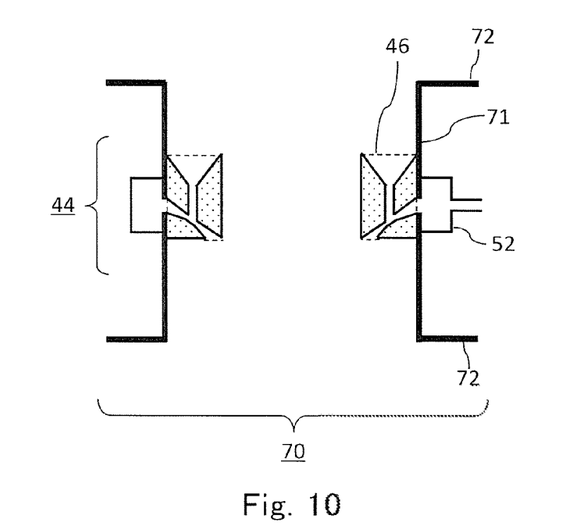
FIG. 10 is a cross-sectional view of a unit electrode that constitutes the discharge tube in the fifth embodiment of the present invention shown in FIG. 9.

FIG. 9 is a cross-sectional view of a discharge tube 60 according to a fifth embodiment of the present invention. FIG. 10 is a cross-sectional view of a unit electrode 70 that constitutes the discharge tube 60 in the fifth embodiment of the present invention shown in FIG. 9.

In FIG. 9, the discharge tube 60 is provided with four unit electrodes 70a, 70b, 70c, and 70d coupled to each other in a longitudinal direction by bolts 73, an upper insulator 11 attached to a top of the unit electrode 70a, a lower insulator 12 attached to a bottom of the unit electrode 70d, and a wire electrode 15 held by an upper holder 13 assembled on the upper insulator 11 and a lower holder 14 assembled on the lower insulator 12.

In FIG. 10, the unit electrode 70 is provided with a cylindrical tube portion 71 constituted by metal, coupling portions 72 provided at upper and lower ends of the cylindrical tube portion, a water-droplet-forming member 46 formed on an inner side of the cylindrical tube portion, and a circulated gas flow path 52 attached so as to cover the cylindrical tube portion 71 from the outer periphery thereof. The water droplet reformation unit 44 is constituted by the water-droplet-forming member 46 and the circulated gas flow path 52.

In the fifth embodiment, the discharge tube 60 is formed by coupling together a plurality of the unit electrodes 70, each provided with the water droplet reformation unit 44 and the cylindrical tube portion 71. Therefore, in comparison to a case in which the discharge tube 60 is formed by a single cylindrical electrode 10, as in the first embodiment, assembly is easier and mass productivity is improved.

Further, a number of the unit electrodes 70 to be installed can be determined as appropriate. For this reason, an optimal height of the discharge tube 60 can be formed in accordance with a type and concentration of organic matter to be decomposed in water to be treated 3.

Note that, in the present invention, a gas suction unit is not limited to a compressor, and may be, for example, a blower, a pump, or the like. Further, in the present invention, water droplets indicates an aggregate of water molecules in a liquid state that exist in air, and a particle size and a number density thereof are not specifically limited.

Further, in the present invention, although there is no limitation on a material to be used for a water-droplet-forming member 46 or a baffle plate 58, that is, a capturing member, it is preferable to form the capturing member from an insulator such as glass, ceramic, resin, or the like. This is because, when the capturing member is formed from a conductive material such as a metal, a distance thereof to the wire electrode 15 may be shortened and strong localized discharges formed, with the result that efficiency of water treatment is reduced.

The invention claimed is:

1. A water treatment apparatus comprising:
a central electrode provided such that a longitudinal direction thereof is set to be vertical; and
an outer periphery electrode provided coaxially with the central electrode so as to surround the central electrode,
water to be treated being treated by applying a high voltage between the central electrode and the outer periphery electrode to thereby form a discharge in a discharge space between the central electrode and the outer periphery electrode and supplying the water to be treated as water droplets or a water film into the discharge space from above the discharge space,
the water treatment apparatus further comprising:
a water droplet reformation unit connected to the outer periphery electrode, wherein
the water droplet reformation unit captures, as trapped water, a portion of the water to be treated falling in the discharge space, performs water droplet reformation by causing the captured trapped water and gas containing oxygen supplied via a gas pipe to be mixed, and jets out water droplets formed by water droplet reformation into the discharge space.

2. The water treatment apparatus of claim 1, further comprising:
a water treatment reactor configured to include the central electrode, the outer periphery electrode, and a water receiver that is provided beneath the outer periphery electrode and accumulates the water to be treated having been subjected to treatment and having fallen in the discharge space, and
a gas suction unit that sucks out the gas containing oxygen from the water treatment reactor and supplies the gas to the water droplet reformation unit via the gas pipe.

3. The water treatment apparatus of claim 2, wherein
a gas suction port for sucking out the gas containing oxygen from the water treatment reactor is provided in the outer periphery electrode above the water droplet reformation unit.

4. The water treatment apparatus of claim 2, wherein
a plurality of discharge tubes are provided, which are formed by connecting, in parallel, discharge tubes configured to include a pair constituted by the central electrode and the outer periphery electrode, and one or more of the water droplet reformation units,
the plurality of discharge tubes are hermetically connected to the water receiver,
a gas suction port for sucking out the gas containing oxygen from the water treatment reactor is provided in the water receiver, and
each of the water droplet reformation units corresponding to the plurality of discharge tubes performs water droplet reformation by causing the captured water to be treated and the gas containing oxygen supplied by the gas suction unit via the gas suction port and the gas pipe to be mixed, and jets out water droplets formed by water droplet reformation into the discharge space.

5. The water treatment apparatus of claim 1, wherein
the water droplet reformation unit jets out the water droplets formed by the water droplet reformation into the discharge space in a direction that is inclined with respect to the vertical direction.

6. The water treatment apparatus of claim 1, wherein
the water droplet reformation unit includes
a capturing member provided so as to run along an inner surface of the outer periphery electrode, and
a gas flow path provided so as to run along an outer surface of the outer periphery electrode,
the outer periphery electrode has a through hole which is continuous to the gas flow path, and
the water droplet reformation unit:
uses the capturing member to capture a portion of the water to be treated falling in the discharge space as trapped water, and
performs the water droplet reformation by supplying the gas containing oxygen supplied via the gas pipe to the discharge space via the gas flow path and the through hole and causing the trapped water and the gas containing oxygen to be mixed.

7. The water treatment apparatus of claim 6, wherein
the capturing member includes
a collecting portion that collects the trapped water, and
a water flow path that extends downward from the collecting portion, and
the water droplet reformation unit performs the water droplet reformation at an intersection at which the water flow path and the gas flow path intersect each other, by causing the trapped water and the gas containing oxygen to be mixed.

8. The water treatment apparatus of claim 7, wherein
a cross-sectional area of the gas flow path is smallest at the intersection.

9. The water treatment apparatus of claim 1, wherein
the outer periphery electrode and the water droplet reformation unit are formed by connecting, in the vertical direction, a plurality of unit electrodes each configured to include
a cylinder-shaped cylindrical tube portion,
coupling portions provided at both ends of the cylindrical tube portion,
the capturing member attached to an inner surface of the cylindrical tube portion, and
the gas pipe attached to an outer surface of the cylindrical tube portion.

10. A water treatment method to be applied in a water treatment apparatus that includes:
a central electrode provided such that a longitudinal direction thereof is set to be vertical; and
an outer periphery electrode provided coaxially with the central electrode so as to surround the central electrode,
water to be treated being treated by applying a high voltage between the central electrode and the outer periphery electrode to thereby form a discharge in a discharge space between the central electrode and the outer periphery electrode, and supplying the water to be treated as water droplets or a water film into the discharge space from above the discharge space,
the water treatment method comprising, in a water droplet reformation unit connected to the outer periphery electrode,
a step in which a portion of the water to be treated falling in the discharge space is captured as trapped water,
a step in which water droplet reformation is performed by causing the captured trapped water and gas containing oxygen supplied via a gas pipe to be mixed, and
a step in which water droplets formed by the water droplet reformation are jetted out into the discharge space.

* * * * *